(12) United States Patent
Takano (10) Patent No.: US 8,325,789 B2
(45) Date of Patent: Dec. 4, 2012

(54) WIRELESS COMMUNICATION APPARATUS, ANTENNA CALIBRATION METHOD AND PROGRAM

(75) Inventor: Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 848 days.

(21) Appl. No.: 12/361,486

(22) Filed: Jan. 28, 2009

(65) Prior Publication Data

US 2009/0196365 A1    Aug. 6, 2009

(30) Foreign Application Priority Data

Feb. 4, 2008   (JP) ................................ P2008-024457

(51) Int. Cl.
*H04B 1/38*      (2006.01)
(52) U.S. Cl. ........................................ 375/221; 375/267
(58) Field of Classification Search .................. 375/267, 375/224, 285, 296, 221; 455/82, 83, 115.1, 455/115.2, 226.1
See application file for complete search history.

(56) References Cited

U.S. PATENT DOCUMENTS

| 6,870,878 | B1 | 3/2005 | Doi et al. |
| 7,680,461 | B2 * | 3/2010 | Takano ........................... 455/69 |
| 7,961,809 | B2 * | 6/2011 | Bourdoux et al. ............ 375/295 |
| 2006/0009162 | A1 | 1/2006 | Tan et al. |

FOREIGN PATENT DOCUMENTS

| JP | 2006-512807 | 4/2006 |
| JP | 2007-116489 | 5/2007 |
| WO | WO 00/08777 | 2/2000 |

* cited by examiner

*Primary Examiner* — Shuwang Liu
*Assistant Examiner* — David Huang
(74) *Attorney, Agent, or Firm* — Finnegan, Henderson, Farabow, Garrett & Dunner LLP.

(57) ABSTRACT

A wireless communication apparatus includes a loopback transfer function acquisition section that, when a first path including all paths from each branch of the first set to each branch of the second set via the antenna is formed, acquires a loopback transfer function of each path included in the first path based on a reception status of a reference signal transmitted from each branch of the first set and received by each branch of the second set, and when a second path opposite to the first path is formed, acquires a loopback transfer function of each path included in the second path based on a reception status of a reference signal transmitted from each branch of the second set and received by each branch of the first set, and a calibration factor calculation section to calculate a calibration factor of each branch based on the acquired loopback transfer functions.

10 Claims, 7 Drawing Sheets

WIRELESS COMMUNICATION APPARATUS, ANTENNA CALIBRATION METHOD AND PROGRAM

CROSS REFERENCES TO RELATED APPLICATIONS

The present invention contains subject matter related to Japanese Patent Application JP 2008-24457 filed in the Japan Patent Office on Feb. 4, 2008, the entire contents of which being incorporated herein by reference.

BACKGROUND OF THE INVENTION

1. Field of the Invention

The present invention relates to a wireless communication apparatus, an antenna calibration method, and a program.

2. Description of the Related Art

Communication technology to achieve high throughput wireless data transmission includes multi-antenna technology that uses a wireless communication apparatus having a plurality of antennas. Adaptive array antenna is known as an example of the multi-antenna technology, and multi-input multi-output (MIMO) communication system is known as an application of the multi-antenna technology.

In the adaptive array antenna, each transmission signal is multiplied by an appropriate weighting factor and transmitted from each antenna, and a signal received by each antenna is multiplied by an appropriate weighting factor and then the weighted signals are combined, thereby controlling the directivity patterns of transmission and reception of the array antenna as a whole. Further, in the MIMO system, both a transmitter and a receiver include a plurality of antennas, and the transmitter transmits a plurality of signal streams using spatial multiplexing, and the receiver separates a received signal into a plurality of signal streams by signal processing.

In any of the multi-antenna technology, the directivity patterns of transmission and reception of the communication apparatus are brought into agreement with each other, so that the main lobe is directed in a desired direction in both transmission and reception thereby achieving the high throughput data transmission. The agreement of the directivity patterns of transmission and reception indicates the establishment of reversibility.

However, in the adaptive array antenna, the reversibility is lost due to characteristics of each element constituting transmitting and receiving systems, and even if the weighting factor calculated at the time of reception is used at the time of transmission, the directivity patterns of transmission and reception cease to agree. Therefore, a correction value is calculated and the weighting factor is corrected using the correction value in advance as antenna calibration, so that the directivity patterns of transmission and reception are brought into agreement. Further, in the MIMO communication apparatus, because a transfer function of a spatial channel and a transfer function of an analog section in the apparatus are recognized altogether as a channel matrix, the reversibility is lost if a transfer function is different between an analog transmitting section and an analog receiving section. Therefore, the antenna calibration is performed in advance so as to bring the directivity patterns of transmission and reception into agreement.

An example of the case where it is necessary to establish the reversibility is when a transmitter transmits a plurality of signal streams using a weighting factor in the MIMO communication apparatus. The use of the weighting factor by the transmitter enables optimization of spatial multiplexing and spatial separation in both of the transmitter and the receiver. In this case, the transmitter acquires a transfer function and calculates a weighting factor based on the reception status of a reference signal that is transmitted from the receiver with use of the reversibility that is established in the spatial channel between the transmitter and the receiver. However, even if the reversibility in the spatial channel is established, (branch) imbalance exists in the characteristics of a transfer function between each analog transmitting section and each analog receiving section in a plurality of transmitting and receiving branches that constitute the communication apparatus due to an error in manufacturing or the like. Therefore, it is necessary to perform antenna calibration that corrects the branch imbalance in order to calculate a weighting factor based on the reception status of a reference signal transmitted from the receiver.

The antenna calibration is generally performed in the following steps as described in Japanese Unexamined Patent Application Publication No. 2007-116489, for example. In the antenna calibration according to the related art, first, the branch 0 is set to the transmitting end, and the branches 1 and 2 are set to the receiving end, and then a reference signal transmitted from the branch 0 is received by the branches 1 and 2, and a loopback transfer function in each path is acquired from the reception status of the reference signal (first acquisition step). Next, the branch 1 is set to the transmitting end, and the branch 0 is set to the receiving end, and then a reference signal transmitted from the branch 1 is received by the branch 0, and a loopback transfer function in the path is acquired from the reception status of the reference signal (second acquisition step). Further, the branch 2 is set to the transmitting end, and the branch 0 is set to the receiving end, and then a reference signal transmitted from the branch 2 is received by the branch 0, and a loopback transfer function in the path is acquired from the reception status of the reference signal (third acquisition step). After that, a calibration factor as a correction value is calculated based on the loopback transfer functions that are acquired in the all paths, and a weighting factor is corrected using the correction value. The reference signal is a known signal that is transmitted and received in the path including the spatial channel and the analog transmitting and receiving sections in order to acquire the loopback transfer function.

SUMMARY OF THE INVENTION

Therefore, in the antenna calibration according to the related art, it is necessary to perform the acquisition steps of the same number as the antennas (branches). In each acquisition step, one branch is set to the transmitting state, another one branch is set to the receiving state, and the remaining branch is set to the standby state or the receiving state. Although the setting of the analog transmitting and receiving sections is changed so as to switch between transmission and reception of the antenna in each acquisition step, because the analog transmitting and receiving sections have a transient response period, it is necessary to wait for several tens of microseconds until the circuit state is stabilized after changing the setting.

If a large difference occurs between the timing of acquiring the loopback transfer function in the transmitting direction and the timing of acquiring the loopback transfer function in the receiving direction due to the change in the setting of the branches, the status of the spatial channel may change during the period. As the number of antennas (branches) increases, the number of times to change the setting of the branches increases accordingly, which increases a difference in the acquisition timing. In such a case, by a change in the status of the spatial channel affecting the loopback transfer function, it is difficult to detect a difference in the transfer function between the analog transmitting section and the analog receiving section. In light of this, it is desired in the antenna calibration to reduce a difference in the timing of acquiring the loopback transfer function between the transmitting direction and the receiving direction as much as possible in order to properly calculate the calibration factor of each branch.

It is thus desirable to provide a wireless communication apparatus, an antenna calibration method and a program capable of properly calculating the calibration factor of each transmitting and receiving branch by minimizing a difference in the timing of acquiring the loopback transfer function between the transmitting direction and the receiving direction.

According to a first embodiment of the present invention, there is provided a wireless communication apparatus including n (n≧3) number of transmitting and receiving branches each including an analog transmitting section and an analog receiving section selectably connected to a corresponding antenna, the transmitting and receiving branches divided into some branches belonging to a first set and other branches belonging to a second set. The wireless communication apparatus includes a loopback transfer function acquisition section to, in a state where a first path including all paths from each branch of the first set to each branch of the second set via the antenna is formed, acquire a loopback transfer function of each path included in the first path based on a reception status of a reference signal transmitted from each branch of the first set and received by each branch of the second set, and in a state where a second path opposite in direction to the first path is formed, acquire a loopback transfer function of each path included in the second path based on a reception status of a reference signal transmitted from each branch of the second set and received by each branch of the first set; and a calibration factor calculation section to calculate a calibration factor of each of the transmitting and receiving branches based on the acquired loopback transfer functions.

In this configuration, in the state where the first path including all the paths from each branch of the first set to each branch of the second set via an antenna is formed, the loopback transfer function of each path included in the first path is acquired based on the reception status of the reference signal transmitted on the first path (first acquisition step). Then, in the state where the second path in the opposite direction to the first path is formed, the loopback transfer function of each path included in the second path is acquired based on the reception status of the reference signal transmitted on the second path (second acquisition step). After that, the calibration factor of each branch is calculated based on the acquired loopback transfer functions of the first and second paths. It is thereby possible to acquire the loopback transfer functions in the transmitting and receiving directions in all branches with use of only two times of acquisition steps each involving a change in the setting of the branch, regardless of the number of branches. This allows the number of times to change the setting of the branch to be a minimum number, thereby reducing a difference in the timing of acquiring the loopback transfer function between the transmitting direction and the receiving direction, which enables proper calculation of the calibration factor of each branch.

The loopback transfer function acquisition section may acquire a loopback transfer function of each path through which the reference signal is transmitted based on the reception status of the reference signal transmitted from each branch of one set of the first set and the second set and received by each branch of the other set, the reference signal being represented by a scalar matrix $X(i, j)(i, j=1, 2, \ldots n)$. The reference signal that is transmitted from each branch of one set and received by each branch of the other set is thereby represented by the scalar matrix $X(i, j)$. Thus, even when the reference signals transmitted from a plurality of branches are received by any one branch substantially simultaneously, it is possible to detect the reception status of each reference signal transmitted from each branch, which enables acquisition of the loopback transfer function of each path through which the reference signal is transmitted.

Further, channel characteristics of a path from a branch j at a transmitting end to a branch i at a receiving end via the antenna may be represented by a channel matrix $H(i, j)(i, j=1, 2, \ldots n)$, and the loopback transfer function acquisition section may acquire a loopback transfer function of each path through which the reference signal is transmitted from the reception status of the reference signal transmitted from each branch of one set of the first set and the second set and received by each branch of the other set, the reference signal being represented by the scalar matrix $X(i, j)(i, j=1, 2, \ldots n)$, based on $D(i, j)=H(i, j)X(i, j)$ where $D(i, j)$ is a matrix indicating the reception status of the reference signal received by each branch of the other set, $H(i, j)$ is a channel matrix indicating channel characteristics of a path from the branch j to the branch i via the antenna, and $X(i, j)$ is a scalar matrix indicating the reference signal transmitted from each branch of one set to each branch of the other set. It is thereby possible to detect the reception status of each reference signal transmitted from each branch based on the relational expression of $D(i,j)=H(i,j)X(i,j)$, using the reference signal represented by the scalar matrix $X(i, j)$.

The reference signal represented by the scalar matrix $X(i, j)$ may be generated by digitally changing a signal in a region of the reference signal included in one transmission packet and divided into regions corresponding to the number n of branches without changing a connection state of the antenna with one of the analog transmitting section and the analog receiving section.

The loopback transfer function acquisition section may acquire a loopback transfer function of each path through which the reference signal is transmitted from the reception status of the reference signal transmitted from each branch of one set of the first set and the second set and received by each branch of the other set, the reference signal being represented by a product $P(i, j)X(i, j)$ of a matrix $P(i, j)(i, j=1, 2, \ldots n)$ in which column vectors are orthogonal to one another and the scalar matrix $X(i, j)$, based on $D(i, j)=H(i, j)P(i, j)X(i, j)P(i, j)^{-1}$ where $P(i, j)$ is a matrix in which column vectors are orthogonal to one another. The reference signal that is transmitted from each branch of one set and received by each branch of the other set is thereby represented by the product $P(i, j)X(i, j)$ of the matrix in which column vectors are orthogonal to one another and the scalar matrix. Thus, even when the reference signals transmitted from a plurality of branches are received by any one branch substantially simultaneously, it is possible to detect the reception status of each reference signal transmitted from each branch, which enables easy acquisition of the loopback transfer function of each path through which the reference signal is transmitted.

The first set may include one transmitting and receiving branch, and the second set may include the other transmitting and receiving branches. It is thereby possible to acquire the loopback transfer functions in the transmitting and receiving directions in all branches with use of only two times of acquisition steps each involving a change in the setting of the branch, regardless of the number of branches.

The wireless communication apparatus may perform multi-input multi-output (MIMO) communication, and it may form adaptive array antenna, using three or more of the transmitting and receiving branches. Further, the wireless communication apparatus may perform communication using an orthogonal frequency division multiplexing (OFDM) modulation scheme as a primary modulation scheme.

According to a second embodiment of the present invention, there is provided an antenna calibration method applied to a wireless communication apparatus including n ($n \geq 3$) number of transmitting and receiving branches each including an analog transmitting section and an analog receiving section selectably connected to a corresponding antenna, the transmitting and receiving branches divided into some branches belonging to a first set and other branches belonging to a second set. The antenna calibration method includes the steps of, in a state where a first path including all paths from each branch of the first set to each branch of the second set via the antenna is formed, acquiring a loopback transfer function of each path included in the first path based on a reception status of a reference signal transmitted from each branch of the first set and received by each branch of the second set; in a state where a second path opposite in direction to the first path is formed, acquiring a loopback transfer function of each path included in the second path based on a reception status of a reference signal transmitted from each branch of the second set and received by each branch of the first set; and calculating a calibration factor of each of the transmitting and receiving branches based on the acquired loopback transfer function.

In this method, it is thereby possible to acquire the loopback transfer functions in the transmitting and receiving directions in all branches with use of only two times of acquisition steps each involving a change in the setting of the branch, regardless of the number of branches.

According to a third embodiment of the present invention, there is provided a program for causing a computer to execute the antenna calibration method according to the second embodiment. The program may be written in any program language.

According to the embodiments of the present invention, it is possible to provide a wireless communication apparatus, an antenna calibration method and a program capable of properly calculating the calibration factor of each transmitting and receiving branch by minimizing a difference in the timing of acquiring the loopback transfer function between the transmitting direction and the receiving direction.

DETAILED DESCRIPTION OF THE PREFERRED EMBODIMENTS

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted.

In the following, typical antenna calibration is described firstly, and then an embodiment of the present invention is described after that. Although a MIMO communication apparatus is taken as an example in the description of the embodiment of the present invention, the present invention may be applied to an adaptive array antenna based on the same principle.

(Typical Antenna Calibration)

Figure 1:
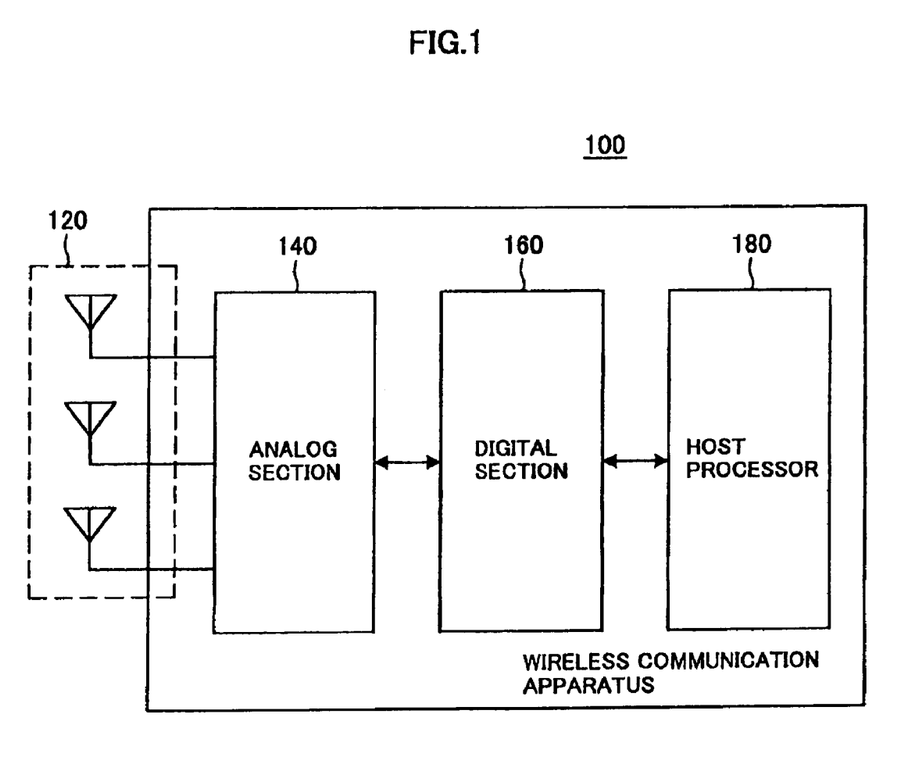
FIG. 1 is a block diagram showing the typical functional configuration of a MIMO communication apparatus according to an embodiment of the present invention.

FIG. 1 is a block diagram showing the typical functional configuration of a MIMO communication apparatus according to the embodiment of the present invention. A communication apparatus 100 according to the embodiment uses orthogonal frequency division multiplexing (OFDM) modulation, and it includes a plurality of antennas 122 and separates a signal transmitted using spatial multiplexing from a transmitting end by means of signal separation such as inverse matrix calculation at a receiving end, thereby increasing a transmission speed.

Referring to FIG. 1, the communication apparatus 100 includes an antenna section 120, an analog section 140, a digital section 160, and a host processor 180. The antenna section 120 includes a plurality of antennas 122 that are shared by transmission and reception.

A transmitting system 142 of the analog section 140 includes a filter, a modulator, a power amplifier and so on, though not shown, and it converts a baseband signal into a transmission signal by frequency conversion into a use frequency band and transmits the signal at a desired transmission power. A receiving system 144 of the analog section 140 includes a filter, a demodulator, a low-noise amplifier (LNA), a variable gain amplifier (VGA) and so on, though not shown, and it converts a received signal into a baseband signal by frequency conversion, performs gain control and acquires a signal of a desired level. The analog section 140 includes analog transmitting sections 142 and analog receiving sections 144 of the same number as the plurality of antennas 122.

The digital section 160 includes a digital signal processing section that receives a signal by OFDM modulation, a spatial signal multiplexing section that spatially multiplexes a plurality of signal streams, and a spatial signal separation section that separates a spatially multiplexed signal, although they are not shown.

The antenna section 120 includes, at its connection portion with the analog section 140, a selector switch 124 that connects the antenna 122 to the analog transmitting section 142 at the time of transmission and connects the antenna 122 to the analog receiving section 144 at the time of reception. Further, the digital section 160 includes, at its connection portion with the analog section 140, an A-D converter 161 and a D-A converter 168 that perform signal conversion between the analog section 140 and the digital section 160.

As a typical example of the MIMO system, an SVD-MIMO system using singular value decomposition (SVD) of a channel function H is known. The SVD-MIMO system performs singular value decomposition of a numeric matrix containing channel information corresponding to each antenna as an element, which is called a channel information matrix H, to obtain $UDV^H$·(U, V: unitary matrix; D: diagonal matrix). Then, V is given as an antenna weighting factor matrix at the transmitting end, and $(UD)^H$ is given as an antenna weighting factor matrix at the receiving end. Each MIMO channel is thereby represented as the diagonal matrix D containing the square root of each singular value $\lambda_i$ as a diagonal element.

In the MIMO system, the main lobe is directed in a desired direction in both transmission and reception by bringing the directivity patterns of transmission and reception of the communication apparatus into agreement or establishing the reversibility, thereby achieving the high throughput data transmission. The establishment of the reversibility in the MIMO system is expressed as $H_{up}=H_{down}^T$ when a channel matrix from the transmitter to the receiver is $H_{down}$, and a channel matrix from the receiver to the transmitter is $H_{up}$. In the MIMO communication apparatus, however, because the transfer function of the spatial channel and the transfer function of the analog section in the apparatus are recognized altogether as the channel matrix, the reversibility is lost if the transfer function is different between the analog transmitting section 142 and the analog receiving section 144. Therefore, the antenna calibration is performed in advance, so that the directivity patterns of transmission and reception agree with each other.

The antenna calibration is divided broadly into out-of-device calibration and in-device calibration. The out-of-device calibration uses a communication apparatus as a calibration target and a transmitting and receiving apparatus for calibration. The transmitting and receiving apparatus receives a reference signal from the communication apparatus and retransmits the reference signal to the communication apparatus. The communication apparatus then compares the reference signal which it has transmitted with the reference signal which is received from the transmitting and receiving apparatus and thereby detects and corrects imbalance in the characteristics of each transmitting and receiving system including the antenna and the analog transmitting and receiving sections. On the other hand, the in-device calibration is performed in a self-contained manner only by a communication apparatus as a calibration target. The communication apparatus loops back a reference signal generated in each transmitting system to a receiving system, compares the reference signal which is transmitted from each transmitting system with the reference signal which is received by the receiving system, and thereby detects and corrects imbalance in the characteristics of each transmitting and receiving system including the antenna and the analog transmitting and receiving sections.

Although the case of performing the in-device calibration is described hereinafter as an example of the antenna calibration, the present invention may be applied to the out-of-device calibration based on the same principle.

Figure 5:
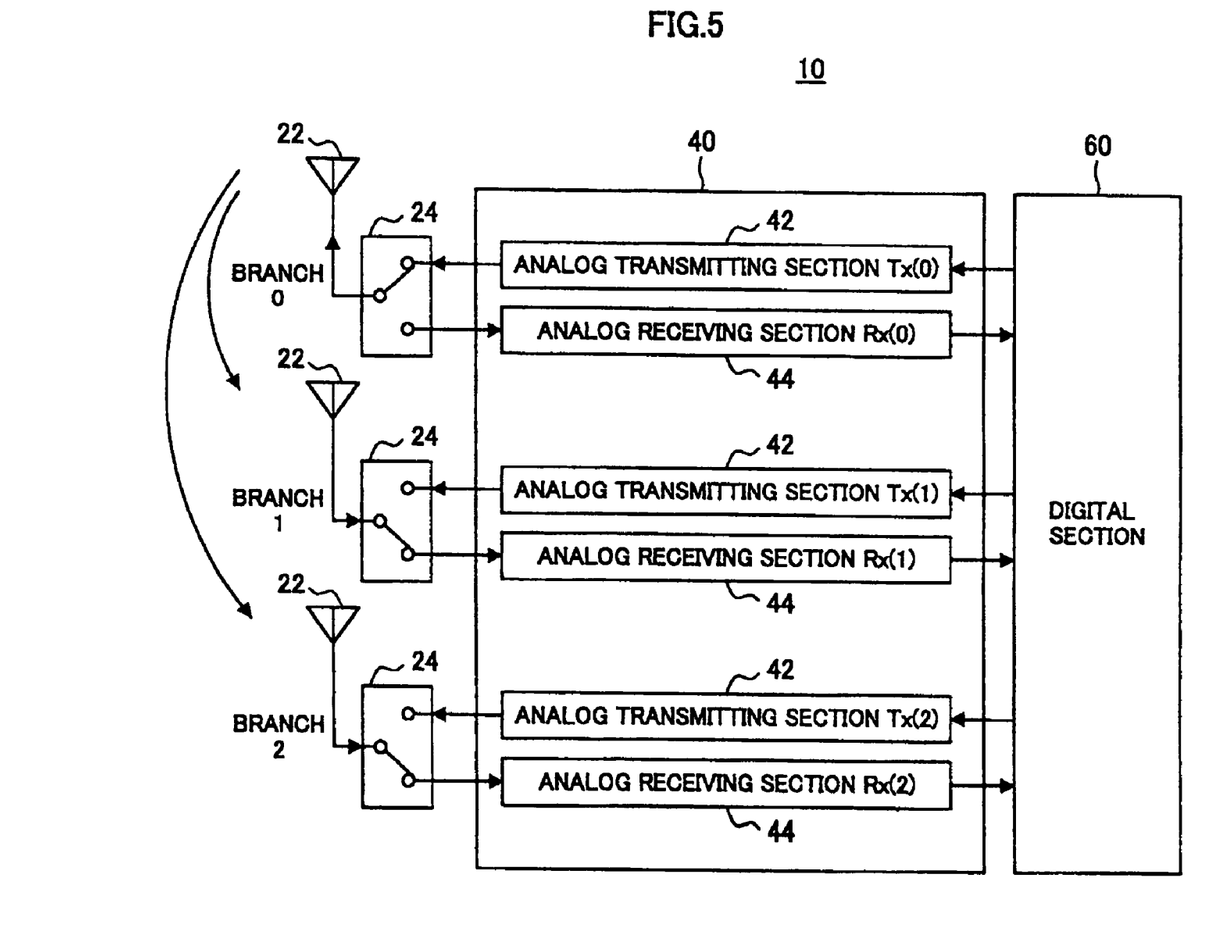
FIG. 5 is an explanatory view (1/3) showing the procedure of acquiring a loopback transfer function in an antenna calibration method according to a related art.

In the following, a communication apparatus 10 that includes three transmitting and receiving branches 0 to 2 as shown in FIG. 5 is described by way of illustration. The branch number that is included in the communication apparatus 10 is i, the transfer function of an analog transmitting section 42 that belongs to the i-th branch is Tx(i), the transfer function of an analog receiving section 44 that belongs to the i-th branch is Rx(i), and the calibration factor as a correction value of an antenna 22 that belongs to each branch is K(i). In such a case, the calibration can be made if a digital section 60 multiplies a transmission signal by the calibration factor K(i) so as to compensate the transfer function Tx(i) of the analog transmitting section 42. Then, the calibration is completed when a ratio between the transfer function Tx(i) of the analog transmitting section 42 and the transfer function Rx(i) of the analog receiving section 44 becomes constant in each branch i as shown in the following expression 1.

$$\frac{Tx(0) \times K(0)}{Rx(0)} = \frac{Tx(1) \times K(1)}{Rx(1)} = \frac{Tx(2) \times K(2)}{Rx(2)} \qquad \text{Expression 1}$$

In the in-device calibration, the calibration factor K(i) is calculated based on a loopback transfer function D(i, j) which is obtained from a signal that is looped back inside the communication apparatus 10, as described later.

The loopback transfer function of the path of transmission from the branch i to the branch j is D(i, j). Consider, for example, the case of performing calibration when the branch 0 is a reference branch. In such a case, the loopback transfer functions D(0, 1), D(0, 2) of the paths of transmission from the branch 0 to the other branches 1 and 2 and the loopback transfer functions D(1, 0), D(2, 0) of the paths of loopback from the other branches 1 and 2 to be received by the branch 0 are acquired as shown in the following expression 2.

$$D(0,1)=Tx(0) \times Rx(1)$$

$$D(0,2)=Tx(0) \times Rx(2)$$

$$D(1,0)=Tx(1) \times Rx(0)$$

$$D(2,0)=Tx(2) \times Rx(0) \qquad \text{Expression 2}$$

If the calibration factor K(0) of the branch 0 is a reference value 1.0, the calibration factors K(1) and K(2) of the other branches 1 and 2 are calculated as shown in the following expression 3.

$$K(0) = 1.0 \qquad \text{Expression 3}$$
$$K(1) = \frac{D(0,1)}{D(1,0)} = \frac{Rx(1)}{Tx(1)} \times \frac{Rx(0)}{Tx(0)}$$
$$K(2) = \frac{D(0,2)}{D(2,0)} = \frac{Rx(2)}{Tx(2)} \times \frac{Rx(0)}{Tx(0)}$$

By verifying the correctness of the above expression 3, it is proved that the condition of the calibration that a ratio between the transfer function Tx(i) of the analog transmitting section 42 and the transfer function Rx(i) of the analog receiving section 44 is constant in each branch is satisfied.

$$\frac{Tx(0) \times K(0)}{Rx(0)} = \frac{Tx(0)}{Rx(0)} \qquad \text{Expression 4}$$
$$\frac{Tx(1) \times K(1)}{Rx(1)} = \frac{Tx(0)}{Rx(0)}$$
$$\frac{Tx(2) \times K(2)}{Rx(2)} = \frac{Tx(0)}{Rx(0)}$$

Because the calibration is performed using the branch 0 as a reference, the calibration factor K(0) of the branch 0 is 1.0 as shown in the above expression 3. Further, the value (Tx(0)/Rx(0)) of the branch 0 is multiplied on the calibration factors K(1) and K(2) of the other branches 1 and 2.

Figure 6:
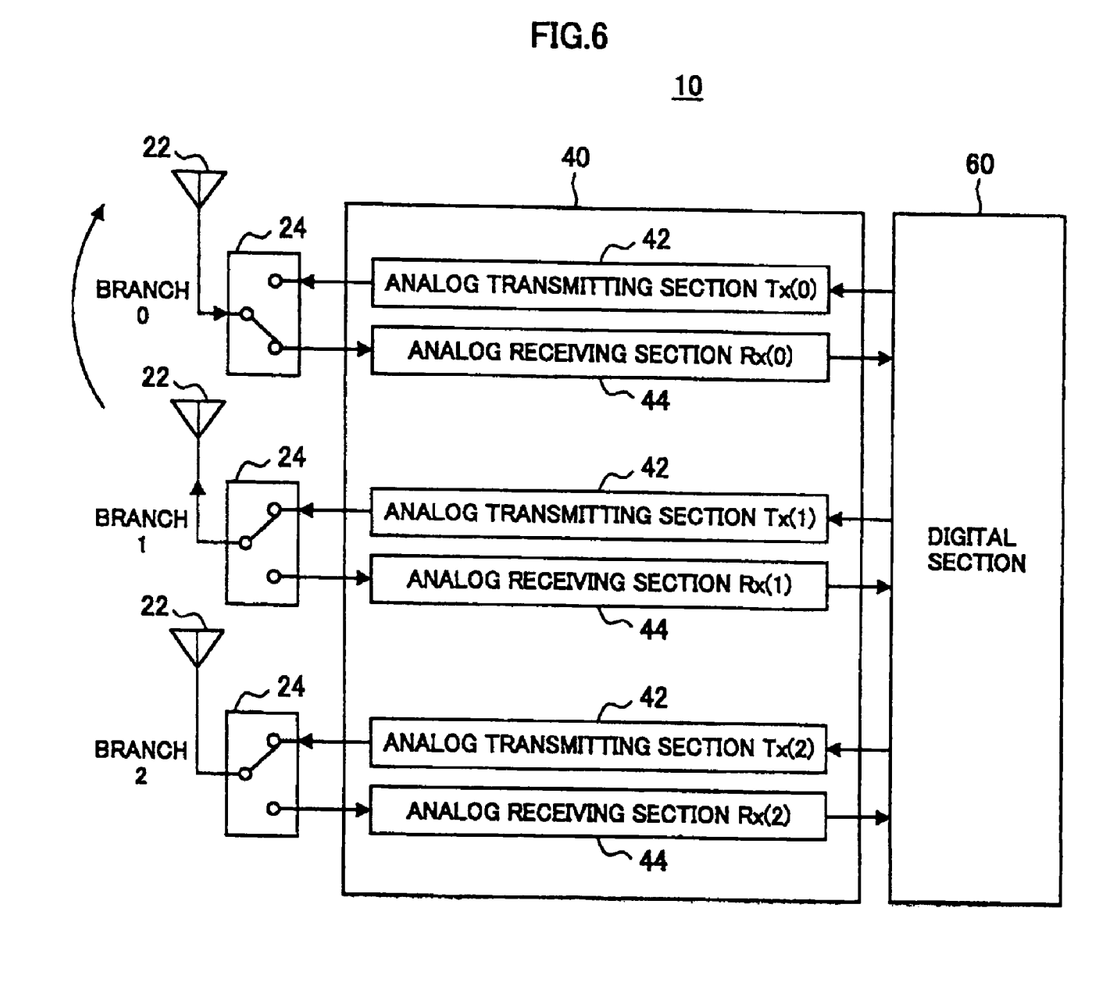
FIG. 6 is an explanatory view (2/3) showing the procedure of acquiring a loopback transfer function in the antenna calibration method according to the related art.
Figure 7:
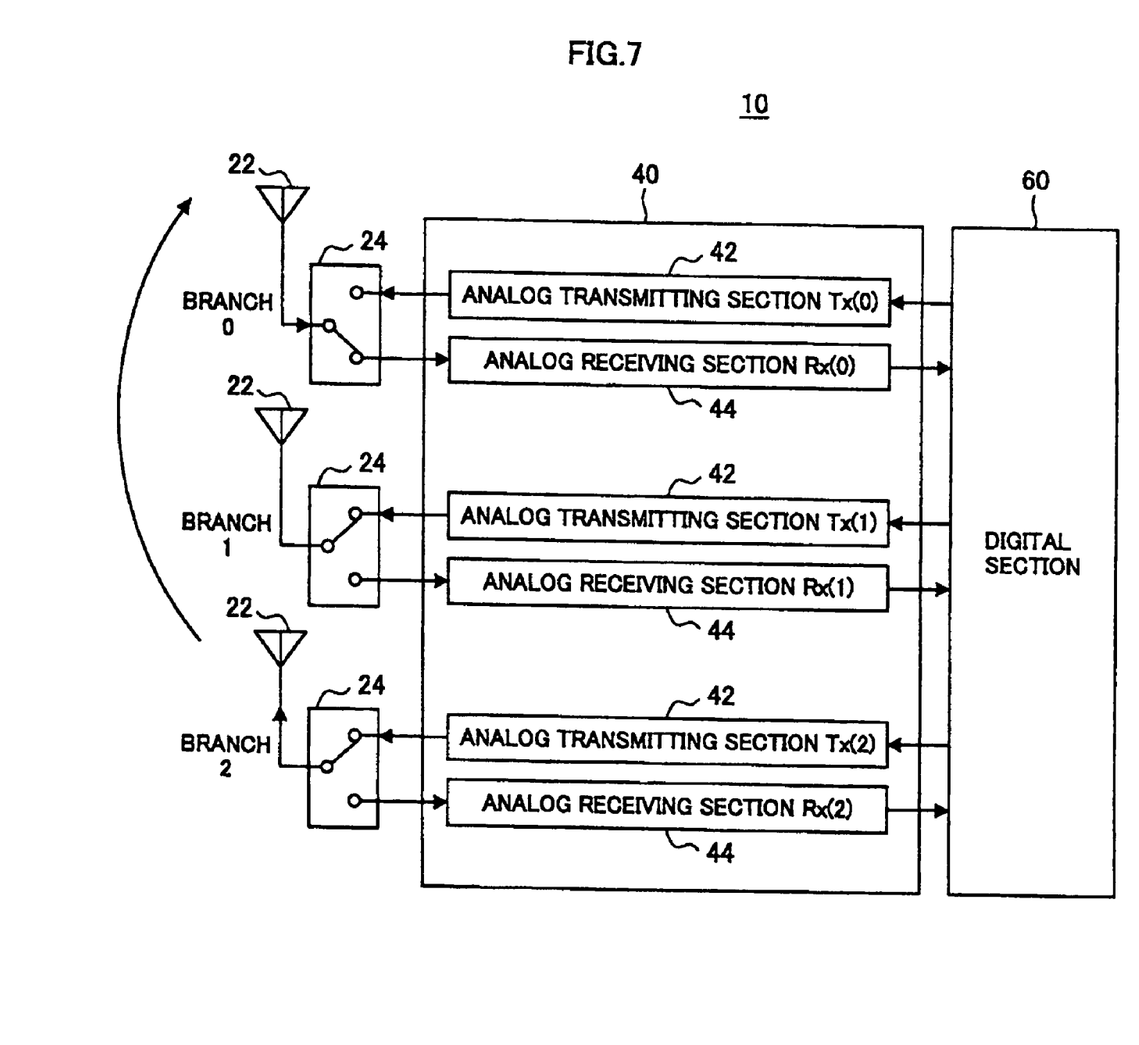
FIG. 7 is an explanatory view (3/3) showing the procedure of acquiring a loopback transfer function in the antenna calibration method according to the related art.

FIGS. 5 to 7 are explanatory views showing the procedure of acquiring the loopback transfer function D(i, j).

Each of the branches 0 to 2 includes the analog transmitting section 42 and the analog receiving section 44, and a connection to the antenna 22 is changed by switching a selector switch 24 according to the transmitting and receiving timing of the reference signal. Further, the digital section 60 performs digital processing on a transmission/received signal of each branch 0 to 2. Each analog transmitting section 42 up-converts an analog-converted transmission signal to an appropriate frequency band by RF (Radio Frequency) processing and sends out the signal from the antenna 22 via the selector switch 24. Each analog receiving section 44 down-converts a signal received by each antenna 22 through a propagation path by RF processing.

Referring to FIG. 5, the antenna 22 is connected to the analog transmitting section 42 in the branch 0 serving as a reference branch, and the antenna 22 is connected to the analog receiving section 44 in the other branches 1 and 2, so that a first path through which the reference signal transmitted from the branch 0 is looped back and received by the other branches 1 and 2 is formed. Then, the loopback transfer functions D(0, 1), D(0, 2) in the first path are acquired in the digital section 60 (first acquisition step).

Referring to FIGS. 6 and 7, the antenna 22 is connected to the analog receiving section 44 in the branch 0, and the antenna 22 is connected to the analog transmitting section 42 in the branch 1 or 2, so that a second path through which the reference signal transmitted from the branch 1 or 2 is looped back and received by the branch 0 is formed. Then, the loopback transfer functions D(1, 0), D(2, 0) in the second path are acquired in the digital section 60 (second and third acquisition steps).

The digital section 60 acquires the loopback transfer function D(i, j) that is obtained by the loopback of the reference signal in the first and second paths, and calculates the calibration factors K(0) to K(2) for compensating the transfer function of the analog section 40 for each branch. Then, the digital section 60 multiplies the transmission signal to each analog transmitting section 42 by the calibration factor K(0) to K(2) upon data transmission, thereby performing calibration so as to establish the reversibility.

As described earlier, in the antenna calibration according to the related art, it is necessary to perform the acquisition steps of the same number as the antennas 22 (branches). In each acquisition step, one branch is set to the transmitting state, another one branch is set to the receiving state, and the remaining branch is set to the standby state or the receiving state. Although the setting of the analog transmitting and receiving sections 42 and 44 is changed so as to switch between transmission and reception of the antenna 22 in each acquisition step, because the analog transmitting and receiving sections 42 and 44 have a transient response period, it is necessary to wait for several tens of microseconds until the circuit state is stabilized after the change in the setting.

If a large difference occurs between the timing of acquiring the loopback transfer function in the transmitting direction and the timing of acquiring the loopback transfer function in the receiving direction due to the change in the setting of the branches, the status of the spatial channel may change during the period. As the number of the antennas 22 (branches) increases, the number of times to change the setting of the branches increases accordingly, which increases a difference in the acquisition timing. In such a case, because by a change in the status of the spatial channel affecting the loopback transfer function, it is difficult to detect a difference in the transfer function between the analog transmitting section 42 and the analog receiving section 44. Thus, it is desired in the antenna calibration to reduce a difference in the timing of acquiring the loopback transfer function between the transmitting direction and the receiving direction as much as possible in order to properly calculate the calibration factor of each branch.

Embodiment of the Present Invention

In order to address the above issue, the wireless communication apparatus and the antenna calibration method according to an embodiment of the present invention acquire a loopback transfer function by the method described hereinbelow. Although the case where the loopback transfer function is acquired using the communication apparatus including three transmitting and receiving branches is described as an example below, the present invention may be equally applied to the communication apparatus including four or more transmitting and receiving branches.

Figure 2:
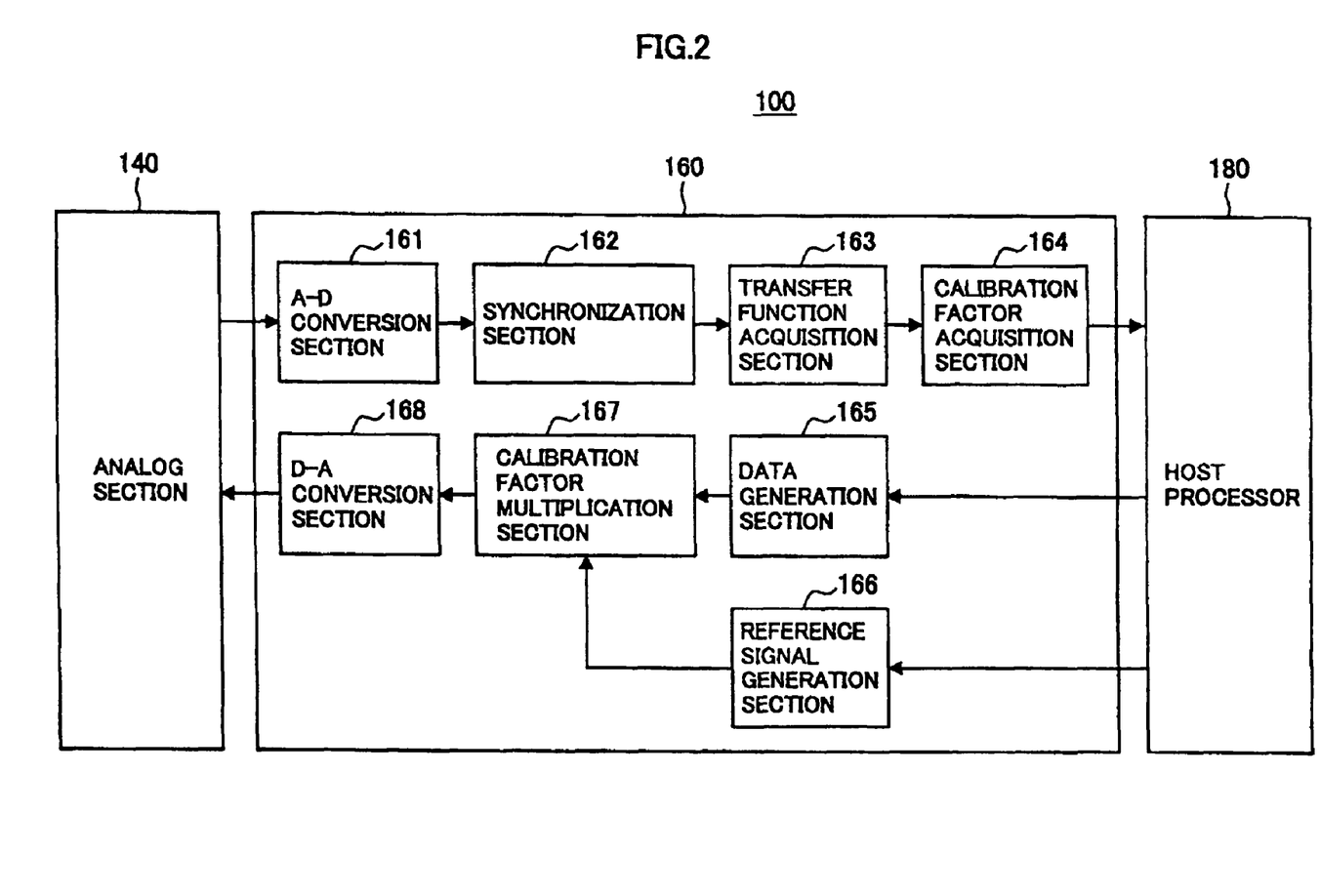
FIG. 2 is a block diagram showing the functional configuration of a digital section of a wireless communication apparatus according to the embodiment.

FIG. 2 is a block diagram showing the functional configuration of the digital section of the wireless communication apparatus according to the embodiment.

A receiving system of the digital section 160 includes an A-D (Audio to Digital) conversion section 161, a synchronization section 162, a transfer function acquisition section 163, and a calibration factor acquisition section 164. The receiving system converts a baseband signal that has been down-converted in the analog receiving section 144 into a digital signal and then performs processing such as packet detection, synchronization and frequency offset compensation. Further, in the receiving system, at the time of calibration, the transfer function acquisition section 163 serving as a loopback transfer function acquisition section acquires a loopback transfer function in the path between the branches based on the reception status of one or more reference signals that are looped back from the other branches and received. Then, the calibration factor acquisition section 164 serving as a calibration factor calculation section acquires calibration factors K(0) to K(2) of the analog transmitting and receiving sections 142 and 144 of each branch using the acquired loopback transfer function D(i, j) and sets them to a calibration factor multiplication section 167 of a transmitting system, which is described below.

The transmitting system of the digital section 160 includes a data generation section 165, a reference signal generation section 166, the calibration factor multiplication section 167, and a D-A (Digital to Audio) conversion section 168. The data generation section 165 allocates transmission data supplied from the host processor 180 to the transmitting system of each branch. The reference signal generation section 166 generates a reference signal to be received by other branches at the time of calibration, as described in detail later. The calibration factor multiplication section 167 multiplies a signal to be transmitted to each branch by the calibration factor K(i) at the time of data transmission, thereby performing calibration.

Figure 3:
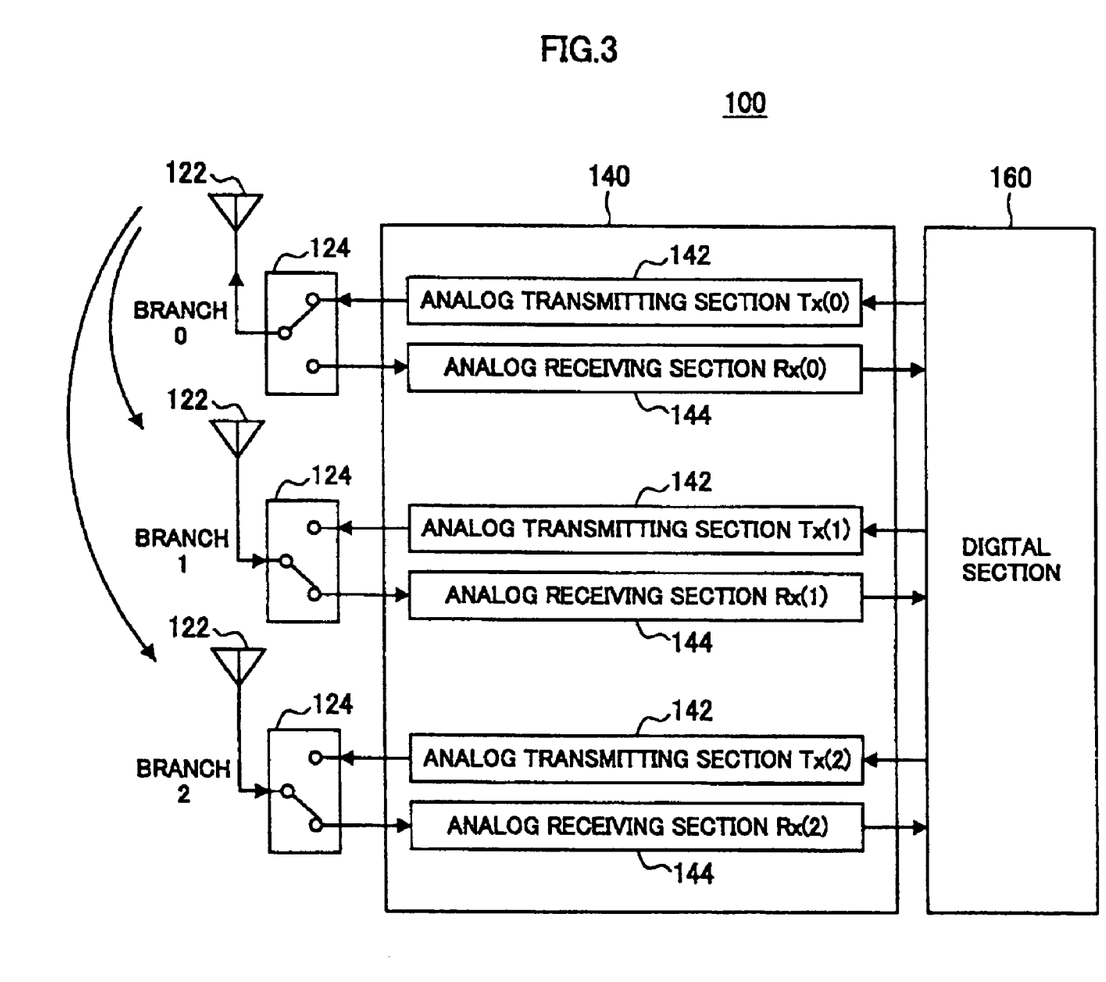
FIG. 3 is an explanatory view (1/2) showing the procedure of acquiring a loopback transfer function in an antenna calibration method according to the embodiment.
Figure 4:
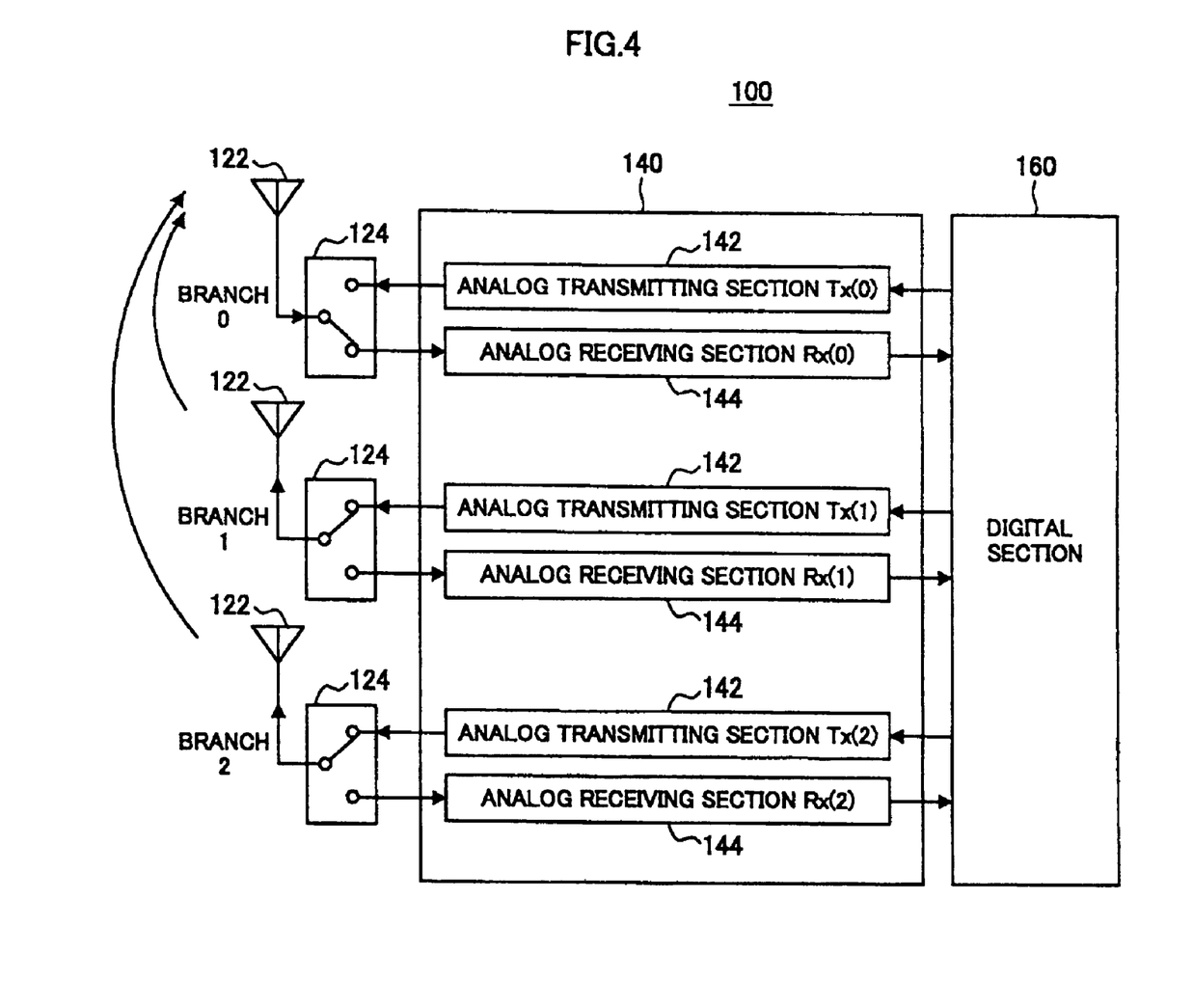
FIG. 4 is an explanatory view (2/2) showing the procedure of acquiring a loopback transfer function in the antenna calibration method according to the embodiment.

FIGS. 3 and 4 are explanatory views showing the procedure of acquiring the loopback transfer function D(i, j) in the antenna calibration method according to the embodiment. The configuration of the communication apparatus 100 that is composed of the branches each including the antenna 122, the selector switch 124, the analog section 140 (including the analog transmitting section 142 and the analog receiving section 144) and the digital section 160 is the same as the functional configuration of the typical communication apparatus 10 described earlier, and it is thus not described in detail below.

In the example shown in FIGS. 3 and 4, the branch 0 is set as a reference branch. Referring to FIG. 3, the antenna 122 is connected to the analog transmitting section 142 in the branch 0, and the antenna 122 is connected to the analog receiving section 144 in the other branches 1 and 2, so that a first path through which the reference signal transmitted from the branch 0 is looped back and received by the other branches 1 and 2 is formed. Then, in the digital section 60, the loopback transfer functions D(0, 1), D(0, 2) in the first path are acquired based on the reception status of the reference signal transmitted from the branch 0 to the branches 1 and 2 (first acquisition step).

Referring to FIG. 4, the antenna 122 is connected to the analog receiving section 144 in the branch 0, and the antenna 122 is connected to the analog transmitting section 142 in the branches 1 and 2, so that a second path through which the reference signals transmitted from the branches 1 and 2 are looped back and received by the branch 0 is formed. Then, in the digital section 160, the loopback transfer functions D(1, 0), D(2, 0) in the second path are acquired based on the reception status of the reference signals transmitted from the branches 1 and 2 to the branch 0 (second acquisition step).

After that, the calibration factor K(i) is calculated by the above-mentioned expression 3 based on the acquired loopback transfer function b(i, j), in the same manner as a typical antenna calibration method. Then, a weighting factor is corrected using the calculated calibration factor K(i) as a correction value.

In the second acquisition step, because the reference signals are transmitted from the branches 1 and 2 to the branch 0 substantially simultaneously, the branch 0 receives the reference signals from the branches 1 and 2 substantially simultaneously. This raises an issue that it is difficult for the digital section 160 to distinguish between the reception status of the reference signal transmitted from the branch 1 and the reception status of the reference signal transmitted from the branch 2.

This issue is described hereinafter by taking an example. For example, the transfer function of the path including the spatial channel and the analog transmitting and receiving sections 142 and 144 is represented by a channel matrix $H_0$, and a known reference signal is represented by a reference signal matrix $X_0$ as shown in the following expression 5.

$$H_0 = \begin{bmatrix} a & b & c \\ d & e & f \\ g & h & i \end{bmatrix} \quad \text{Expression 5}$$

$$X_0 = \begin{bmatrix} Ref \\ Ref \\ Ref \end{bmatrix}$$

The channel matrix $H_0$ represents the transfer function of the path of transmission from the branch j at the transmitting end to the branch i at the receiving end. For example, the matrix element "b" of the channel matrix $H_0$ indicates a transfer function that is made up of the transfer function of the analog transmitting section 142 of the branch 1, the transfer function of the spatial channel of transmission from the branch 1 to the branch 0, and the transfer function of the analog receiving section 144 of the branch 0. The reference signal matrix $X_0$ is represented by a 3×1 matrix including the same matrix elements Ref.

The reference signal represented by the reference signal matrix $X_0$ that is transmitted from the branch 1 and the branch 2 is received by the branch 0 as a signal shown in the following expression 6. Because the branch in the transmitting state does not receive a signal and the branch in the receiving state does not transmit a signal, "0" is substituted in advance into some matrix elements of the channel matrix $H_0$.

$$D = \begin{bmatrix} 0 & b & c \\ 0 & 0 & 0 \\ 0 & 0 & 0 \end{bmatrix} \begin{bmatrix} Ref \\ Ref \\ Ref \end{bmatrix} = \begin{bmatrix} (b+c)Ref \\ 0 \\ 0 \end{bmatrix} \quad \text{Expression 6}$$

Because the matrix element Ref of the reference signal matrix $X_0$ is known, the signal received by the branch 0 is divided by the matrix element Ref, thereby acquiring the loopback transfer function D shown in the following expression 7.

$$D = \begin{bmatrix} (b+c) \\ 0 \\ 0 \end{bmatrix} \quad \text{Expression 7}$$

With the loopback transfer function D represented by the above expression 7, it is hard to distinguish between the loopback transfer function b in the path of transmission from the branch 1 to the branch 0 and the loopback transfer function c in the path of transmission from the branch 2 to the branch 0. This raises an issue of not being able to acquire the loopback transfer function b in the path of transmission from the branch 1 to the branch 0 and the loopback transfer function c in the path of transmission from the branch 2 to the branch 0.

First Embodiment

In light of this, it is proposed to use a first acquisition method described hereinbelow. In the first acquisition method proposed below, a signal corresponding to the reference signal matrix $X_1$ shown in the following expression 8 is transmitted as a reference signal.

$$X_1 = \begin{bmatrix} Ref & 0 & 0 \\ 0 & Ref & 0 \\ 0 & 0 & Ref \end{bmatrix} \quad \text{Expression 8}$$

The reference signal represented by the reference signal matrix $X_1$ is a 3×3 scalar matrix. Although the matrix element Ref of the reference signal matrix $X_1$ may be any of an actual number and a complex number, the case where Ref=1 is described hereinafter by way of illustration.

The reference signal matrix $X_1$ is obtained by transmitting the reference signal after dividing the region of the reference signal into three in one transmission packet. Specifically, the reference signal is transmitted from the branch 1 in the state where the branch 2 is in the transmitting mode and the transmission data of the branch 2 is 0, and the reference signal is transmitted from the branch 2 in the state where the branch 1 is in the transmitting mode and the transmission data of the branch 1 is 0. The reference signal represented by the reference signal matrix $X_1$ is generated by digitally changing the signal in one transmission packet without a change in the setting of the branch. There is thus no need to change the setting of the branch after transmitting the reference signal from the branch 1 to the branch 0. It is thereby possible to transmit the reference signal from the branch 2 to the branch 0 without waiting for a transient response period that occurs after changing the setting of the branch.

The reference signal represented by the reference signal matrix $X_1$ that is transmitted from the branch 1 and the branch 2 is received by the branch 0, and the loopback transfer function D shown in the following expression 9 is acquired from the signal received by the branch 0.

$$D = \begin{bmatrix} 0 & b & c \\ 0 & 0 & 0 \\ 0 & 0 & 0 \end{bmatrix} \begin{bmatrix} 1 & 0 & 0 \\ 0 & 1 & 0 \\ 0 & 0 & 1 \end{bmatrix} = \begin{bmatrix} 0 & b & c \\ 0 & 0 & 0 \\ 0 & 0 & 0 \end{bmatrix} \quad \text{Expression 9}$$

With the loopback transfer function D represented by the above expression 9, it is possible to distinguish between the loopback transfer function b (corresponding to D(1, 0)) in the path of transmission from the branch 1 to the branch 0 and the loopback transfer function c corresponding to D(2, 0)) in the path of transmission from the branch 2 to the branch 0 and acquire the respective loopback transfer functions.

In the wireless communication apparatus and the antenna calibration method according to the first embodiment described above, in the state where a first path including all the paths from each branch of a first set to each branch of a second set through an antenna is formed, a loopback transfer function of each path included in the first path is acquired based on the reception status of the reference signal transmitted on the first path (first acquisition step). Then, in the state where a second path in the opposite direction to the first path is formed, a loopback transfer function of each path included in the second path is acquired based on the reception status of the reference signal transmitted on the second path (second acquisition step). After that, the calibration factor of each transmitting and receiving branch is calculated based on the acquired loopback transfer functions of the first and second paths.

It is thereby possible to acquire the loopback transfer functions in the transmitting and receiving directions in all branches with use of only two acquisition steps each involving a change in the setting of the branch, regardless of the number of branches. This allows the number of times to change the setting of the branch to be a minimum number, thereby maintaining a small difference in the timing of acquiring the loopback transfer function between the transmitting direction and the receiving direction, which enables proper calculation of the calibration factor of each branch.

A computer may serve as the above-described wireless communication apparatus by installing a program for implementing the above function in the computer. In this case, the program is stored in memory or the like included in the host processor 180 or the like, and it is read out and executed according to need by a control section or the like included in the host processor 180 or the like.

Further, the reference signal that is transmitted from each branch of one set and received by each branch of another set is represented by a scalar matrix X(i, j). Thus, even when the reference signals transmitted from a plurality of branches are received by any one branch substantially simultaneously, it is possible to detect the reception status of each reference signal transmitted from each branch, which enables acquisition of the loopback transfer function of each path through which the reference signal is transmitted.

Second Embodiment

Although the first acquisition method can acquire the transfer functions b and c, there is an issue of the setting of a gain value when receiving a transmission packet in the branch 0. Specifically, it is relatively difficult to calculate a gain value (AGC (Automatic Gain Control) fixed value) that is commonly set when a difference between the transfer function b and the transfer function c is large.

In light of this, it is proposed to use a second acquisition method described hereinbelow. In the second acquisition method proposed below, a signal represented by a product $P_1 X_1$ of the reference signal matrix $X_1$ shown in the above expression 9 and a matrix $P_1$, which is shown in the following expression 10, is transmitted as a reference signal.

$$P_1 X_1 = \begin{bmatrix} 1 & 1 & 1 \\ 1 & \exp(-j2\pi/3) & \exp(-j4\pi/3) \\ 1 & \exp(-j4\pi/3) & \exp(-j2\pi/3) \end{bmatrix} \begin{bmatrix} 1 & 0 & 0 \\ 0 & 1 & 0 \\ 0 & 0 & 1 \end{bmatrix} \quad \text{Expression 10}$$

$$= \begin{bmatrix} 1 & 1 & 1 \\ 1 & \exp(-j2\pi/3) & \exp(-j4\pi/3) \\ 1 & \exp(-j4\pi/3) & \exp(-j2\pi/3) \end{bmatrix}$$

The matrix $P_1$ is a 3×3 matrix of full rank in which the inner product of the column vectors is 0, that is, the column vectors are completely orthogonal to one another. The matrix $P_1$ shown in the above expression 10 is an example of the matrix in which the column vectors are completely orthogonal to one another, and the matrix elements are not limited thereto. If an inverse matrix $P^{-1}$ of the matrix $P_1$ is multiplied on the right side of the product $P_1 X_1$ of the matrixes that is used as a reference signal, the reference signal matrix $X_1$ can be completely reconstructed, and therefore degradation of a received signal does not occur at all. Further, in the case where degradation of a received signal is allowed to a certain extent, a matrix of relatively lower rank may be used rather than the matrix of full rank as the matrix $P_1$.

The reference signal $P_1 X_1$ transmitted from the branch 1 and the branch 2 is received by the branch 0 as a signal shown in the following expression 11. Then, the loopback transfer function shown in the following expression 12 is acquired from the signal received by the branch 0.

$$D = H_1 P_1 X_1 P_1^{-1} \quad \text{Expression 11}$$

$$= \begin{bmatrix} 0 & b & c \\ 0 & 0 & 0 \\ 0 & 0 & 0 \end{bmatrix} \begin{bmatrix} 1 & 1 & 1 \\ 1 & \exp(-j2\pi/3) & \exp(-j4\pi/3) \\ 1 & \exp(-j4\pi/3) & \exp(-j2\pi/3) \end{bmatrix}$$

$$\begin{bmatrix} 1 & 0 & 0 \\ 0 & 1 & 0 \\ 0 & 0 & 1 \end{bmatrix} P^{-1}$$

If $x = \exp(-j2n/3)$ and $y = \exp(-j4n/3)$.

-continued $$D = \begin{bmatrix} b+c & bx+cy & cx+by \\ 0 & 0 & 0 \\ 0 & 0 & 0 \end{bmatrix} \frac{1}{(x-y)(x+y-2)}$$
$$\begin{bmatrix} x^2-y^2 & y-x & y-x \\ y-x & x-1 & 1-y \\ y-x & 1-y & x-1 \end{bmatrix}$$
$$= \begin{bmatrix} 0 & b & c \\ 0 & 0 & 0 \\ 0 & 0 & 0 \end{bmatrix}$$

Expression 12

In the second acquisition method, it is possible to distinguish between the loopback transfer functions b and c and acquire them. Further, because the reference signals that are transmitted simultaneously from the branch 1 and the branch 2 are received by the branch 0 as shown in the above expression 10, it is possible to receive the signal with a stable gain value. Therefore, the setting of a gain value when receiving a transmission packet in the branch 0, which is an issue in the first acquisition method, does not arise as an issue.

In the wireless communication apparatus and the antenna calibration method according to the second embodiment described above, the reference signal that is transmitted from each branch of one set and received by each branch of another set is represented by the product P(i, j)X(i, j) of the matrix in which column vectors are orthogonal to one another and the scalar matrix. Thus, even when the reference signals transmitted from a plurality of branches are received substantially simultaneously, it is possible to detect the reception status of each reference signal transmitted from each branch, which enables easy acquisition of the loopback transfer function of each path through which the reference signal is transmitted.

Alternative Example

Although the case of using the 3×3 matrix $P_1$ is described in the example described above, the case of using a 4×4 matrix $P_2$ is described in the same manner. For example, the transfer function of the path including the spatial channel and the analog transmitting and receiving sections 142 and 144 is represented by a channel matrix $H_2$, which is a 4×4 matrix, and a reference signal is expressed by a reference signal matrix $X_2$ as shown in the following expression 13.

$$H_2 = \begin{bmatrix} a & b & c & d \\ e & f & g & h \\ i & j & k & l \\ m & n & o & p \end{bmatrix}$$
$$X_2 = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

Expression 13

In this case, like the second acquisition method described above, a product $P_2X_2$ of the reference signal matrix $X_2$ and the matrix $P_2$ as shown in the following expression 14 is transmitted as a reference signal. The matrix $P_2$ shown in the expression 14 is a 4×4 matrix, which is an example of the matrix in which the column vectors are orthogonal to one another, and the matrix elements are not limited thereto.

$$P_2X_2 = \begin{bmatrix} 1 & -1 & 1 & 1 \\ 1 & 1 & -1 & 1 \\ 1 & 1 & 1 & -1 \\ -1 & 1 & 1 & 1 \end{bmatrix} \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$
$$= \begin{bmatrix} 1 & -1 & 1 & 1 \\ 1 & 1 & -1 & 1 \\ 1 & 1 & 1 & -1 \\ -1 & 1 & 1 & 1 \end{bmatrix}$$

Expression 14

The reference signal represented by the reference signal matrix $P_2X_2$ transmitted from the branch 1 and the branch 2 is received by the branch 0, and the loopback transfer function D is acquired from the signal received by the branch 0 as shown in the following expression 15.

$$D = H_2 P_2 X_2 P_2^{-1}$$
$$= \begin{bmatrix} 0 & b & c & d \\ 0 & 0 & 0 & 0 \\ 0 & 0 & 0 & 0 \\ 0 & 0 & 0 & 0 \end{bmatrix} \begin{bmatrix} 1 & -1 & 1 & 1 \\ 1 & 1 & -1 & 1 \\ 1 & 1 & 1 & -1 \\ -1 & 1 & 1 & 1 \end{bmatrix} P$$
$$= \begin{bmatrix} b+c-d & b+c+d & -b+c+d & b-c+d \\ 0 & 0 & 0 & 0 \\ 0 & 0 & 0 & 0 \\ 0 & 0 & 0 & 0 \end{bmatrix}$$
$$\frac{1}{8}\begin{bmatrix} 1 & 1 & 1 & -1 \\ -1 & 1 & 1 & 1 \\ 1 & 1 & 1 & 1 \\ 1 & 1 & 1 & 1 \end{bmatrix}$$
$$= \frac{1}{2}\begin{bmatrix} 0 & b & c & d \\ 0 & 0 & 0 & 0 \\ 0 & 0 & 0 & 0 \\ 0 & 0 & 0 & 0 \end{bmatrix}$$

Expression 15

Therefore, it is possible to distinguish between the loopback transfer functions b, c and d and acquire them in the case of using the 4×4 matrix $P_2$ as well.

Although a preferred embodiment of the present invention is described in the foregoing with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

In the above embodiments, the case where any one of the n (n≧3) number of transmitting and receiving branches 142 and 144 is a reference branch, and two times of acquisition steps are performed between the reference branch and each of the other branches is described as an example. However, the present invention may be equally applied to the case where the n (n≧3) number of transmitting and receiving branches 142 and 144 are divided into a first set including one or more branches and a second set including the other branches, and two times of acquisition steps are performed between the first set and the second set, for example.

Further, in the above embodiments, the case where the loopback transfer function is acquired in the path of transmission from a reference branch to each of the other branches (first acquisition step), and then the loopback transfer function is acquired in the opposite path (second acquisition step) is described. However, the order of executing the first and second acquisition steps may be reversed.

What is claimed is:

1. A wireless communication apparatus including n (n≧3) number of transmitting and receiving branches each including an analog transmitting section and an analog receiving section selectably connected to a corresponding antenna, the transmitting and receiving branches divided into some branches belonging to a first set and other branches belonging to a second set, the wireless communication apparatus comprising:
a loopback transfer function acquisition section to, in a state where a first path including all paths from each branch of the first set to each branch of the second set via the antenna is formed, acquire a loopback transfer function of each path included in the first path based on a reception status of a reference signal transmitted from each branch of the first set and received by each branch of the second set, and in a state where a second path opposite in direction to the first path is formed, acquire a loopback transfer function of each path included in the second path based on a reception status of a reference signal transmitted from each branch of the second set and received by each branch of the first set; and
a calibration factor calculation section to calculate a calibration factor of each of the transmitting and receiving branches based on the acquired loopback transfer functions;
wherein the loopback transfer function acquisition section acquires a loopback transfer function of each path through which the reference signal is transmitted based on the reception status of the reference signal transmitted from each branch of one set of the first set and the second set and received by each branch of the other set the reference signal being represented by a scalar matrix X(i, j)(i, j=1, 2, . . . n).

2. The wireless communication apparatus according to claim 1, wherein
channel characteristics of a path from a branch j at a transmitting end to a branch i at a receiving end via the antenna are represented by a channel matrix H(i, j)(i, j=1, 2, . . . n), and
the loopback transfer function acquisition section acquires a loopback transfer function of each path through which the reference signal is transmitted from the reception status of the reference signal transmitted from each branch of one set of the first set and the second set and received by each branch of the other set, the reference signal being represented by the scalar matrix X(i, j)(i, j=1, 2, . . . n), based on expression 1:

$$D(i,j)=H(i,j)X(i,j)$$

where
D(i, j) is a matrix indicating the reception status of the reference signal received by each branch of the other set,
H(i, j) is a channel matrix indicating channel characteristics of a path from the branch j to the branch i via the antenna, and
X(i, j) is a scalar matrix indicating the reference signal transmitted from each branch of one set to each branch of the other set.

3. The wireless communication apparatus according to claim 2, wherein the loopback transfer function acquisition section acquires a loopback transfer function of each path through which the reference signal is transmitted from the reception status of the reference signal transmitted from each branch of one set of the first set and the second set and received by each branch of the other set, the reference signal being represented by a product P(i, j)X(i, j) of a matrix P(i, j)(i, j=1, 2, . . . n) in which column vectors are orthogonal to one another and the scalar matrix X(i, j), based on expression 2:

$$D(i,j)=H(i,j)P(i,j)X(i,j)P(i,j)^{-1}$$

where P(i, j) is a matrix in which column vectors are orthogonal to one another.

4. The wireless communication apparatus according to claim 1, wherein
the reference signal represented by the scalar matrix X(i, j) is generated by digitally changing a signal in a region of the reference signal included in one transmission packet and divided into regions corresponding to the number n of branches without changing a connection state of the antenna with one of the analog transmitting section and the analog receiving section.

5. The wireless communication apparatus according to claim 1, wherein
the first set includes one transmitting and receiving branch, and the second set includes the other transmitting and receiving branches.

6. The wireless communication apparatus according to claim 1, wherein
multi-input multi-output (MIMO) communication is performed using three or more of the transmitting and receiving branches.

7. The wireless communication apparatus according to claim 1, wherein
adaptive array antenna is formed using three or more of the transmitting and receiving branches.

8. The wireless communication apparatus according to claim 1, wherein
communication is performed using an orthogonal frequency division multiplexing (OFDM) modulation scheme as a primary modulation scheme.

9. An antenna calibration method applied to a wireless communication apparatus including n (n≧3) number of transmitting and receiving branches each including an analog transmitting section and an analog receiving section selectably connected to a corresponding antenna, the transmitting and receiving branches divided into some branches belonging to a first set and other branches belonging to a second set, the antenna calibration method comprising the steps of:
in a state where a first path including all paths from each branch of the first set to each branch of the second set via the antenna is formed, acquiring a loopback transfer function of each path included in the first path based on a reception status of a reference signal transmitted from each branch of the first set and received by each branch of the second set;
in a state where a second path opposite in direction to the first path is formed, acquiring a loopback transfer function of each path included in the second path based on a reception status of a reference signal transmitted from each branch of the second set and received by each branch of the first set; and
calculating a calibration factor of each of the transmitting and receiving branches based on the acquired loopback transfer functions;

wherein the loopback transfer function of each path through which the reference signal is transmitted based on the reception status of the reference signal transmitted from each branch of one set of the first set and the second set and received by each branch of the other set the reference signal being represented by a scalar matrix X(i, j)(i, j=1, 2, ... n).

10. A non-transitory computer-readable storage medium for causing a computer to execute an antenna calibration method applied to a wireless communication apparatus including n (n≧3) number of transmitting and receiving branches each including an analog transmitting section and an analog receiving section selectably connected to a corresponding antenna, the transmitting and receiving branches divided into some branches belonging to a first set and other branches belonging to a second set, the antenna calibration method comprising the steps of:

in a state where a first path including all paths from each branch of the first set to each branch of the second set via the antenna is formed, acquiring a loopback transfer function of each path included in the first path based on a reception status of a reference signal transmitted from each branch of the first set and received by each branch of the second set;

in a state where a second path opposite in direction to the first path is formed, acquiring a loopback transfer function of each path included in the second path based on a reception status of a reference signal transmitted from each branch of the second set and received by each branch of the first set; and calculating a calibration factor of each of the transmitting and receiving branches based on the acquired loopback transfer functions;

wherein the loopback transfer function of each path through which the reference signal is transmitted based on the reception status of the reference signal transmitted from each branch of one set of the first set and the second set and received by each branch of the other set the reference signal being represented by a scalar matrix X(i, j)(i, j=1, 2, ... n).

* * * * *